(12) United States Patent
Nonni et al.

(10) Patent No.: US 10,865,519 B2
(45) Date of Patent: Dec. 15, 2020

(54) MODIFIED CELLULOSE FROM CHEMICAL FIBER AND METHODS OF MAKING AND USING THE SAME

(71) Applicant: GP Cellulose GmbH, Zug (CH)

(72) Inventors: Arthur J. Nonni, Peachtree City, GA (US); Charles E. Courchene, Snellville, GA (US)

(73) Assignee: GP Cellulose GMBH, Zug (CH)

( * ) Notice: Subject to any disclaimer, the term of this patent is extended or adjusted under 35 U.S.C. 154(b) by 518 days.

(21) Appl. No.: 15/810,208

(22) Filed: Nov. 13, 2017

(65) Prior Publication Data

US 2018/0135245 A1    May 17, 2018

Related U.S. Application Data

(60) Provisional application No. 62/422,612, filed on Nov. 16, 2016.

(51) Int. Cl.

| | | |
|---|---|---|
| *D21C 9/14* | (2006.01) | |
| *D21C 9/10* | (2006.01) | |
| *D21H 27/00* | (2006.01) | |
| *D21C 9/16* | (2006.01) | |
| *D21H 11/04* | (2006.01) | |
| *B01J 23/72* | (2006.01) | |
| *B01J 23/745* | (2006.01) | |
| *C08B 15/04* | (2006.01) | |
| *D21C 3/26* | (2006.01) | |
| *D21H 11/20* | (2006.01) | |

(52) U.S. Cl.
CPC ............ *D21C 9/1057* (2013.01); *B01J 23/72* (2013.01); *B01J 23/745* (2013.01); *C08B 15/04* (2013.01); *D21C 3/26* (2013.01); *D21C 9/10* (2013.01); *D21C 9/1036* (2013.01); *D21C 9/14* (2013.01); *D21C 9/144* (2013.01); *D21C 9/16* (2013.01); *D21C 9/163* (2013.01); *D21H 11/04* (2013.01); *D21H 11/20* (2013.01); *D21H 27/002* (2013.01)

(58) Field of Classification Search
None
See application file for complete search history.

(56) References Cited

U.S. PATENT DOCUMENTS

| | | |
|---|---|---|
| 1,298,552 A | 3/1919 | Ornstein |
| 1,298,553 A | 3/1919 | Ornstein |
| 1,298,554 A | 3/1919 | Ornstein |
| 1,860,431 A | 5/1932 | Richter |
| 2,112,116 A | 3/1938 | Richter |
| 2,178,696 A | 11/1939 | Muskat et al. |
| 2,212,338 A | 8/1940 | Bown |
| 2,368,527 A | 1/1945 | Edelstein |
| 2,512,338 A | 6/1950 | Klug et al. |
| 2,749,336 A | 6/1956 | Boddicker et al. |
| 2,975,169 A | 3/1961 | Cranford et al. |
| 2,978,446 A | 4/1961 | Battista et al. |
| 3,308,012 A | 3/1967 | Tobar |
| 3,707,148 A | 12/1972 | Bryce |
| 3,728,331 A | 4/1973 | Savage |
| 3,728,213 A | 7/1973 | Hinz |
| 3,868,955 A | 3/1975 | Steiger et al. |
| 4,022,965 A | 5/1977 | Goheen et al. |
| 4,222,819 A | 9/1980 | Fossum et al. |
| 4,270,976 A | 6/1981 | Sandstrom et al. |
| 4,410,397 A | 10/1983 | Kempf |
| 4,427,490 A | 1/1984 | Eckert |
| 4,444,621 A | 4/1984 | Lindahl |
| 4,454,005 A | 6/1984 | Stofko et al. |
| 4,470,212 A | 9/1984 | Stafford et al. |
| 4,599,138 A | 7/1986 | Lindahl |
| 4,614,646 A | 9/1986 | Christiansen |
| 4,619,663 A | 10/1986 | Tatin |
| 4,661,205 A | 4/1987 | Ow et al. |
| H479 H | 6/1988 | Wood et al. |
| 4,756,799 A | 7/1988 | Bengtsson et al. |
| 4,783,239 A | 11/1988 | Rich |
| 4,869,783 A | 9/1989 | Prusas et al. |
| 4,875,974 A | 10/1989 | Rich |
| 4,889,595 A | 12/1989 | Herron et al. |
| 5,002,635 A | 3/1991 | Gentile, Jr. et al. |
| 5,087,324 A | 2/1992 | Awofeso et al. |
| 5,296,099 A | 3/1994 | Griggs et al. |
| 5,300,358 A | 4/1994 | Evers |
| 5,302,248 A | 4/1994 | Weinstock et al. |
| 5,346,589 A | 9/1994 | Braunstein et al. |
| 5,383,964 A | 1/1995 | Suc et al. |

(Continued)

FOREIGN PATENT DOCUMENTS

| | | |
|---|---|---|
| CA | 1129161 | 8/1982 |
| CA | 1190360 | 7/1985 |

(Continued)

OTHER PUBLICATIONS

International Search Report dated May 24, 2018, in International No. PCT/US2017/061224.

(Continued)

*Primary Examiner* — Jacob T Minskey

(57) ABSTRACT

This disclosure relates to improved products containing oxidized cellulose. This disclosure further relates to improved methods of making oxidized cellulose in multi-stage bleaching processes, including, for example, in four-stage and three-stage bleaching processes. This disclosure further relates to products made therefrom, including wipe, tissue, towel, and napkin products.

21 Claims, No Drawings

(56) References Cited

U.S. PATENT DOCUMENTS

| | | |
|---|---|---|
| 5,447,602 A | 9/1995 | Sajbel et al. |
| 5,460,924 A | 10/1995 | Buchanan et al. |
| 5,522,967 A | 6/1996 | Shet |
| 5,529,662 A | 6/1996 | Tan et al. |
| 5,536,625 A | 7/1996 | Buchanan et al. |
| 5,552,019 A | 9/1996 | Weinstock et al. |
| 5,562,645 A | 10/1996 | Tanzer et al. |
| 5,580,485 A | 12/1996 | Feringa et al. |
| 5,593,543 A | 1/1997 | Balos et al. |
| 5,607,546 A | 3/1997 | Hoglund et al. |
| 5,630,906 A | 5/1997 | Boe et al. |
| 5,639,348 A | 6/1997 | Payton et al. |
| 5,703,225 A | 12/1997 | Shet et al. |
| 5,766,159 A | 6/1998 | Martin et al. |
| 5,780,618 A | 7/1998 | Banker et al. |
| 5,853,428 A | 12/1998 | Collins et al. |
| 5,863,389 A | 1/1999 | White et al. |
| 5,876,625 A | 3/1999 | Collins et al. |
| 5,994,531 A | 11/1999 | Doenges et al. |
| 6,010,594 A | 1/2000 | Henricson et al. |
| 6,048,437 A | 4/2000 | Fukushima et al. |
| 6,063,982 A | 5/2000 | Martin et al. |
| 6,099,586 A | 8/2000 | Collins et al. |
| 6,100,441 A | 8/2000 | Blomstrom et al. |
| 6,136,223 A | 10/2000 | Collins et al. |
| 6,146,494 A | 11/2000 | Seger et al. |
| 6,210,801 B1 | 4/2001 | Luo et al. |
| 6,214,164 B1 | 4/2001 | Rantala |
| 6,214,976 B1 | 4/2001 | Watanabe et al. |
| 6,221,487 B1 | 4/2001 | Luo et al. |
| 6,228,126 B1 | 5/2001 | Cimecioglu et al. |
| 6,235,392 B1 | 5/2001 | Luo et al. |
| 6,241,779 B1 | 6/2001 | Collins et al. |
| 6,258,207 B1 | 7/2001 | Pan |
| 6,302,997 B1 | 10/2001 | Hurter et al. |
| 6,306,253 B2 | 10/2001 | Henricson |
| 6,306,334 B1 | 10/2001 | Luo et al. |
| 6,319,361 B1 | 11/2001 | Smith et al. |
| 6,331,354 B1 | 12/2001 | Sealey, II et al. |
| 6,368,456 B1 | 4/2002 | Cimecioglu et al. |
| 6,379,494 B1 | 4/2002 | Jewell et al. |
| 6,398,908 B1 | 6/2002 | Hermansson et al. |
| 6,432,266 B1 | 8/2002 | Fukushima et al. |
| 6,436,238 B1 | 8/2002 | Pitkanen et al. |
| 6,440,523 B1 | 8/2002 | Sealey, II et al. |
| 6,440,547 B1 | 8/2002 | Luo et al. |
| 6,444,314 B1 | 9/2002 | Luo et al. |
| 6,458,245 B1 | 10/2002 | Hoglund et al. |
| 6,471,727 B2 | 10/2002 | Luo et al. |
| 6,491,788 B2 | 12/2002 | Sealey, II et al. |
| 6,511,930 B1 | 1/2003 | Luo et al. |
| 6,514,380 B1 | 2/2003 | Laine et al. |
| 6,514,613 B2 | 2/2003 | Luo et al. |
| 6,515,049 B1 | 2/2003 | Doenges et al. |
| 6,518,419 B1 | 2/2003 | Van Der Lugt et al. |
| 6,524,348 B1 | 2/2003 | Jewell et al. |
| 6,528,163 B2 | 3/2003 | Sealey, II et al. |
| 6,540,876 B1 | 4/2003 | Cimecioglu et al. |
| 6,541,627 B1 | 4/2003 | Ono et al. |
| 6,562,195 B2 | 5/2003 | Cimecioglu et al. |
| 6,582,559 B2 | 6/2003 | Thornton et al. |
| 6,586,588 B1 | 7/2003 | Cimecioglu et al. |
| 6,596,033 B1 | 7/2003 | Luo et al. |
| 6,605,181 B1 | 8/2003 | Bergqvist et al. |
| 6,605,350 B1 | 8/2003 | Sealey, II et al. |
| 6,627,749 B1 | 9/2003 | Kumar |
| 6,632,328 B2 | 10/2003 | Wan et al. |
| 6,635,755 B1 | 10/2003 | Jaschinski et al. |
| 6,685,856 B2 | 2/2004 | Sealey, II et al. |
| 6,686,039 B2 | 2/2004 | Sealey, II et al. |
| 6,686,040 B2 | 2/2004 | Sealey, II et al. |
| 6,686,464 B1 | 2/2004 | Harding et al. |
| 6,692,827 B2 | 2/2004 | Luo et al. |
| 6,695,950 B2 | 2/2004 | Cimecioglu et al. |
| 6,699,358 B1 | 3/2004 | Evans et al. |
| 6,706,237 B2 | 3/2004 | Luo et al. |
| 6,706,876 B2 | 3/2004 | Luo et al. |
| 6,716,976 B1 | 4/2004 | Jetten et al. |
| 6,743,332 B2 | 6/2004 | Haynes et al. |
| 6,765,042 B1 | 7/2004 | Thornton et al. |
| 6,770,168 B1 | 8/2004 | Stigsson |
| 6,770,755 B1 | 8/2004 | Gunnars et al. |
| 6,773,552 B1 | 8/2004 | Albert et al. |
| 6,773,648 B2 | 8/2004 | Luo et al. |
| 6,793,686 B2 | 9/2004 | Cimecioglu et al. |
| 6,797,113 B2 | 9/2004 | Sealey, II et al. |
| 6,821,383 B2 | 11/2004 | Shore et al. |
| 6,824,645 B2 | 11/2004 | Jaschinski et al. |
| 6,849,156 B2 | 2/2005 | Besemer et al. |
| 6,852,904 B2 | 2/2005 | Sun et al. |
| 6,861,023 B2 | 3/2005 | Sealey, II et al. |
| 6,872,821 B2 | 3/2005 | Cimecioglu et al. |
| 6,881,299 B2 | 4/2005 | Parrish et al. |
| 6,896,725 B2 | 5/2005 | Thornton et al. |
| 6,916,466 B2 | 7/2005 | Besemer et al. |
| 6,923,889 B2 | 8/2005 | Huuskonen et al. |
| 6,924,369 B2 | 8/2005 | Doenges et al. |
| 6,936,710 B2 | 8/2005 | Bragt et al. |
| 6,958,108 B1 | 10/2005 | Vuorinen |
| 6,987,181 B2 | 1/2006 | Jaschinski et al. |
| 7,001,483 B2 | 2/2006 | Severeid et al. |
| 7,019,191 B2 | 3/2006 | Looney et al. |
| 7,022,837 B2 | 4/2006 | Harding et al. |
| 7,067,444 B2 | 6/2006 | Luo et al. |
| 7,083,704 B2 | 8/2006 | Sealey, II et al. |
| 7,090,744 B2 | 8/2006 | Sealey, II et al. |
| 7,094,317 B2 | 8/2006 | Lundberg et al. |
| 7,161,005 B2 | 1/2007 | Schlingloff et al. |
| 7,247,722 B2 | 7/2007 | Cimecioglu et al. |
| 7,252,837 B2 | 8/2007 | Guo et al. |
| 7,279,071 B2 | 10/2007 | Williams et al. |
| 7,279,177 B2 | 10/2007 | Looney et al. |
| 7,326,317 B2 | 2/2008 | Westermark et al. |
| 7,390,566 B2 | 6/2008 | Luo et al. |
| 7,411,110 B2 | 8/2008 | Sawyer et al. |
| 7,455,902 B2 | 11/2008 | Weerawarna et al. |
| 7,456,285 B2 | 11/2008 | Schlingloff et al. |
| 7,520,958 B2 | 4/2009 | Tan et al. |
| 7,541,396 B2 | 6/2009 | Luo et al. |
| 7,608,167 B2 | 10/2009 | Luo et al. |
| 7,692,004 B2 | 4/2010 | Schlingloff et al. |
| 7,700,764 B2 | 4/2010 | Heijnesson-Hulten |
| 7,708,214 B2 | 5/2010 | Medoff |
| 7,727,945 B2 | 6/2010 | Rodrigues et al. |
| 7,867,358 B2 | 1/2011 | Medoff |
| 7,867,359 B2 | 1/2011 | Medoff |
| 7,939,101 B2 | 5/2011 | Obae et al. |
| 7,947,292 B2 | 5/2011 | Besemer et al. |
| 7,955,536 B2 | 6/2011 | Sawyer et al. |
| 7,971,809 B2 | 7/2011 | Medoff |
| 7,976,676 B2 | 7/2011 | Yin et al. |
| 8,007,635 B2 | 8/2011 | Tan et al. |
| 8,029,896 B2 | 10/2011 | Kumamoto et al. |
| 8,044,013 B2 | 10/2011 | Schlingloff et al. |
| 8,057,636 B2 | 11/2011 | Vinson et al. |
| 8,084,391 B2 | 12/2011 | Weerawarna |
| 8,282,774 B2 | 10/2012 | Tan et al. |
| 8,372,765 B2 | 2/2013 | Braig et al. |
| 8,778,136 B2 | 7/2014 | Nonni et al. |
| 9,511,167 B2 | 12/2016 | Nonni et al. |
| 9,512,237 B2 | 12/2016 | Nonni et al. |
| 9,512,561 B2 | 12/2016 | Nonni et al. |
| 9,512,562 B2 | 12/2016 | Nonni et al. |
| 9,512,563 B2 | 12/2016 | Nonni et al. |
| 9,777,432 B2 | 10/2017 | Nonni et al. |
| 9,909,257 B2 | 3/2018 | Nonni et al. |
| 9,926,666 B2 | 3/2018 | Nonni et al. |
| 9,970,158 B2 | 5/2018 | Nonni et al. |
| 2001/0025695 A1 | 10/2001 | Patt et al. |
| 2001/0028955 A1 | 10/2001 | Luo et al. |
| 2001/0050153 A1 | 12/2001 | Wajer et al. |
| 2002/0005262 A1 | 1/2002 | Cimecioglu et al. |
| 2002/0034638 A1 | 3/2002 | Sealey, II et al. |
| 2002/0072598 A1 | 6/2002 | Besemer et al. |

(56) References Cited

U.S. PATENT DOCUMENTS

| | | |
|---|---|---|
| 2002/0144796 A1 | 10/2002 | Wan et al. |
| 2002/0165110 A1 | 11/2002 | Reinhardt et al. |
| 2003/0019596 A1 | 1/2003 | Ragauskas et al. |
| 2003/0026828 A1 | 2/2003 | Besemer et al. |
| 2003/0084983 A1 | 5/2003 | Rangachari et al. |
| 2003/0208175 A1 | 11/2003 | Gross et al. |
| 2004/0024375 A1 | 2/2004 | Litvay |
| 2004/0154761 A1 | 8/2004 | Duggirala et al. |
| 2004/0154765 A1 | 8/2004 | Huuskonen et al. |
| 2005/0028956 A1 | 2/2005 | Winslow |
| 2005/0051288 A1 | 3/2005 | Yin |
| 2005/0061455 A1 | 3/2005 | Tan et al. |
| 2005/0084412 A1 | 4/2005 | MacDonald et al. |
| 2006/0004335 A1 | 1/2006 | Wang et al. |
| 2006/0070711 A1 | 4/2006 | Luo |
| 2006/0142483 A1 | 6/2006 | Weerawarna |
| 2006/0144535 A1 | 7/2006 | Nguyen et al. |
| 2006/0159733 A1 | 7/2006 | Pendharkar et al. |
| 2006/0260773 A1 | 11/2006 | Tan et al. |
| 2007/0000627 A1 | 1/2007 | Tan et al. |
| 2007/0051481 A1 | 3/2007 | Tan et al. |
| 2007/0119556 A1 | 5/2007 | Tan et al. |
| 2007/0125507 A1 | 6/2007 | Walter et al. |
| 2007/0143932 A1 | 6/2007 | Buchert et al. |
| 2007/0163735 A1 | 7/2007 | Buchert et al. |
| 2007/0190110 A1 | 8/2007 | Pameijer et al. |
| 2007/0199668 A1 | 8/2007 | Scarpello et al. |
| 2007/0272377 A1 | 11/2007 | Mei et al. |
| 2008/0188636 A1 | 8/2008 | Argyropoulos et al. |
| 2008/0294132 A1 | 11/2008 | Tan et al. |
| 2008/0308239 A1 | 12/2008 | Hart et al. |
| 2009/0044345 A1 | 2/2009 | Schlingloff et al. |
| 2009/0054863 A1 | 2/2009 | Tan et al. |
| 2009/0165968 A1 | 7/2009 | Tan et al. |
| 2009/0312537 A1 | 12/2009 | Medoff |
| 2010/0055437 A1 | 3/2010 | Fink et al. |
| 2010/0124583 A1 | 5/2010 | Medoff |
| 2010/0206501 A1 | 8/2010 | Medoff |
| 2010/0233481 A1 | 9/2010 | Isogai et al. |
| 2010/0282422 A1 | 11/2010 | Miyawaki et al. |
| 2010/0316863 A1 | 12/2010 | Kumamoto et al. |
| 2010/0320156 A1 | 12/2010 | Olaiya et al. |
| 2011/0139383 A1 | 6/2011 | Medoff |
| 2011/0287275 A1 | 11/2011 | Tan et al. |
| 2012/0004194 A1 | 1/2012 | Lu et al. |
| 2013/0066291 A1 | 3/2013 | Tan et al. |
| 2014/0274680 A1* | 9/2014 | Nonni ............... C08B 15/04 |
| | | 502/404 |

FOREIGN PATENT DOCUMENTS

| | | |
|---|---|---|
| CA | 2469922 A1 | 7/2003 |
| DE | 19620241 | 11/1997 |
| DE | 10123665 | 11/2002 |
| EP | 0172135 | 2/1986 |
| EP | 0480469 | 4/1992 |
| EP | 0716182 | 6/1996 |
| EP | 0647158 | 8/1997 |
| EP | 0845966 | 3/2000 |
| EP | 0999222 | 5/2000 |
| EP | 1077285 | 2/2001 |
| EP | 1106732 | 6/2001 |
| EP | 1154074 | 11/2001 |
| EP | 1156065 | 11/2001 |
| EP | 1093467 | 3/2002 |
| EP | 0889997 | 7/2002 |
| EP | 0923635 | 2/2003 |
| EP | 1300420 | 4/2003 |
| EP | 0787231 | 5/2003 |
| EP | 1228099 | 9/2003 |
| EP | 1025305 | 11/2003 |
| EP | 1068376 | 11/2003 |
| EP | 0511695 | 6/2004 |
| EP | 1430911 | 6/2004 |
| EP | 1155039 | 7/2004 |
| EP | 0863158 | 11/2004 |
| EP | 1077286 | 2/2005 |
| EP | 1541590 | 6/2005 |
| EP | 1278913 | 11/2005 |
| EP | 1155040 | 4/2006 |
| EP | 1383857 | 5/2006 |
| EP | 1245722 | 6/2006 |
| EP | 1230456 | 7/2006 |
| EP | 1676863 | 7/2006 |
| EP | 1311717 | 8/2006 |
| EP | 1137672 | 12/2006 |
| EP | 1743906 | 1/2007 |
| EP | 1668180 | 8/2007 |
| EP | 1862587 | 12/2007 |
| EP | 2084325 | 4/2010 |
| EP | 2216345 | 8/2010 |
| EP | 2226414 | 9/2010 |
| EP | 1694711 | 12/2010 |
| FR | 2688787 | 9/1993 |
| GB | 555985 | 9/1943 |
| JP | S58054089 | 3/1983 |
| JP | 2001/115389 | 4/2001 |
| JP | 2003/026701 | 1/2003 |
| RU | 2268327 | 5/2005 |
| WO | WO 1992/014760 | 9/1992 |
| WO | WO 1994/020673 | 9/1994 |
| WO | WO 1994/021690 | 9/1994 |
| WO | WO 1995/006157 | 3/1995 |
| WO | WO 1995/026438 | 10/1995 |
| WO | WO 1995/034628 | 12/1995 |
| WO | WO 1995/035406 | 12/1995 |
| WO | WO 1995/035408 | 12/1995 |
| WO | WO 1996/009434 | 3/1996 |
| WO | WO 1996/020667 | 7/1996 |
| WO | WO 1996/038111 | 12/1996 |
| WO | WO 1997/022749 | 6/1997 |
| WO | WO 1997/030208 | 8/1997 |
| WO | WO 1998/003626 | 1/1998 |
| WO | WO 1998/056981 | 12/1998 |
| WO | WO 1999/009244 | 2/1999 |
| WO | WO 1999/047733 | 9/1999 |
| WO | WO 1999/057158 | 11/1999 |
| WO | WO 1999/057370 | 11/1999 |
| WO | WO 2000/026257 | 5/2000 |
| WO | WO 2000/047812 | 8/2000 |
| WO | WO 2000/050462 | 8/2000 |
| WO | WO 2000/050463 | 8/2000 |
| WO | WO 2000/065145 | 11/2000 |
| WO | WO 2001/029309 | 4/2001 |
| WO | WO 2001/034656 | 5/2001 |
| WO | WO 2001/034657 | 5/2001 |
| WO | WO 2001/083887 | 11/2001 |
| WO | WO 2001/088236 | 11/2001 |
| WO | WO 2002/048196 | 6/2002 |
| WO | WO 2002/048197 | 6/2002 |
| WO | WO 2002/049565 | 6/2002 |
| WO | WO 2002/086206 | 10/2002 |
| WO | WO 2002/088289 | 11/2002 |
| WO | WO 2002/095129 | 11/2002 |
| WO | WO 2003/006739 | 1/2003 |
| WO | WO 03/042451 | 5/2003 |
| WO | WO 2003/042451 | 5/2003 |
| WO | WO 2003/051410 | 6/2003 |
| WO | WO 2003/053483 | 7/2003 |
| WO | WO 2004/062703 | 7/2004 |
| WO | WO 2005/028744 | 3/2005 |
| WO | WO 2005/058972 | 6/2005 |
| WO | WO 2005/068074 | 7/2005 |
| WO | WO 2006/102543 | 9/2006 |
| WO | WO 2006/119392 | 11/2006 |
| WO | WO 2006/125517 | 11/2006 |
| WO | WO 2006/127880 | 11/2006 |
| WO | WO 2007/042192 | 4/2007 |
| WO | WO 2007/090461 | 8/2007 |
| WO | WO 2008/010187 | 1/2008 |
| WO | WO 2008/098037 | 8/2008 |
| WO | WO 2008/153565 | 12/2008 |
| WO | WO 2008/154073 | 12/2008 |

(56) References Cited

FOREIGN PATENT DOCUMENTS

| | | |
|---|---|---|
| WO | WO 2009/134746 | 11/2009 |
| WO | WO 2010/025224 | 3/2010 |
| WO | WO 2010/138941 | 12/2010 |
| WO | WO 2011/002956 | 1/2011 |
| WO | WO 2011/022224 | 2/2011 |
| WO | WO 2011/088889 | 7/2011 |
| WO | WO 2011/089123 | 7/2011 |
| WO | WO 2011/090425 | 7/2011 |
| WO | WO 2013/106703 | 7/2013 |
| WO | WO 2013/158384 | 10/2013 |
| WO | WO 2014/122533 | 8/2014 |
| WO | WO 2014/140852 | 9/2014 |
| WO | WO 2014/140940 | 9/2014 |
| WO | WO 2015/138335 | 9/2015 |
| WO | WO 2017/066499 | 4/2017 |
| WO | WO 2017/095831 | 6/2017 |
| WO | WO 2017/210079 | 12/2017 |

OTHER PUBLICATIONS

Burgess, "Relationships Between Colour Production in Cellulose and the Chemical Changes Brought About by Bleaching," Transcript of a Lecture given at the Meeting of the Book and Paper Specialty Group, AIC Annual Meeting, Milwaukee, May 27-30, 1982 (http://cool.conversation-us.org/coolaic/sg/bpg/annual/v01/bp01-05.html).
Dang et al., "Alkaline peroxide treatment of ECF bleached softwood kraft pulps. Part 1. Characterizing the effect of alkaline peroxide treatment on carboxyl groups of fibers," Holzforschung,vol. 61, pp. 445-450, 2007.
Dang, "The Investigation of Carboxyl Groups of Pulp Fibers During Kraft Pulping, Alkaline Peroxide Bleaching, and TEMPO-mediated Oxication,"Georgia Insitute of Technology, Aug. 2007.
Easty et al., "Estimation of Pulp Yield in Continuous Digesters from Carbohydrate and Lignin Determinations," TAPPI Journal 65(12):78-80 (1982).
Edwards et al., "Research and Development of Active Cotton Wound Dressings," 2004 Belwide Cotton Conferences, San Antonio, TX.
English-language abstract of DE 10123665, published Nov. 21, 2002.
ESM055B01, Econotech Aldehyde Test, referenced in U.S. Appl. No. 61/182,000, filed May 28, 2009.
fibersource.com, "Cellulose," [retrieved Sep. 12, 2013 from http://www.fibersource.com/F-tutor/cellulose.htm], 5 pages.
Filho et al., "Hydrogen Peroxide in Chemical Pulp Bleaching—an overview," 2002 Congreso Iberoamericano de Invesigacion en cellulosa y Papel, CIADICYP, pp. 1-27.
Georgia-Pacific West, Permit Renewal Response to Comments, 2001.
Gullichsen et al., Chemical Pulping 6A, 1999, Fapet Oy, pp. A207 and A653.
Gullichsen, "Chemical Pulping," Papermaking Science and Technology, Book 6A, pp. A635-A665, 1992.
International Paper, http://web.archive.org/web/20051107013141/hhttp://www.internationalpaper.com/Paper/Paper%20Products/Pulp/Southern_Bleached_So.html, Nov. 7, 2005.

Kennedy et al., The Chemistry and Processing of Wood and Plant Fibrous Materials, p. 155, Woodhead Publishing Ltd, Abington Hall, Abington, Cambridge CBI 6AH, England, 1996.
Kirk, T.K., et al. Characteristics of Cotton Cellulose Depolymerized by a Brown-Rot Fungus, by Acid, or by Chemical Oxidants, Holzforschung, vol. 45, No. 4 (1991) pp. 239-244.
Kubelka et al., "Delignification with Acidic Hydrogen Peroxide Activated by Molybdate," Journal of Pulp and Paper Science: vol. 18, No. 3, May 1992, pp. J108-J114.
Lapierre et al., "The Effect of Magnesium Ions and Chelants on Peroxide Bleaching," Holzforschung, vol. 57, No. 6, pp. 627-633, 2003.
Lenntech BV, http:/www.lentech.com/Fenton-reaction.htm [downloaded from www.archive.org], Jun. 28, 2003 [retrieved Sep. 12, 2013], whole document.
Morton, J.H., The Chemistry and Processing of Wood and Plant Fibrous Materials, Woodhead Publishing Ltd. (1996), pp. 151-158.
Qian et al., Journal of Wood Chemistry and Technology (2002), vol. 22, No. 4, pp. 267-284.
Qian, "The Chemical Mechanism of a Brown-Rot Decay Mimtic System and its Applicationi n paper Recycling Processes," [Chapter 4: The Effects of Chelator Mediated Fenton System on the Fiber and Paper Properties of Hardwood Kraft Pulp], 2001, *Electronic Theses and Dissertations*, Paper 505.
Ragauskas, Copper Number—Carbonyl Content of Pulp Fibers, document date "created" identified as May 12, 2007.
Rahmawati et al., "Pulp bleaching by hydrogen peroxide activated with copper 2,2_-dipyridylamine and 4-aminopyridine complexes," 2005, Chemical Engineering Journal, vol. 112, pp. 167-171.
Rapson, W. Howard and Irving H. Spinner, Chapter 14 in the Bleaching of Pulp (1963).
Rohrling et al., "A novel method for the determination of carbonyl groups in cellulosics by fluorescence labeling. 2. Validation and applications," Biomacromolecules Sep.-Oct. 2002; 3(5): 969-975.
Ruuttunen et al., "Concomitant Usage of Transition Metal Polyanions as Catalysts in Oxygen Delignification: Laboratory Bleaching Trials," 2006, Appita Journal, pp. 1-14.
Shenai, "Studies in Chemically Modified Celluloses. IX. Oxidation of Cellulose in the Presence of Chelating Agents," 1976, Journal of Applied Polymer Science, vol. 20, pp. 385-391.
Smook, Handbook for Pulp and Paper Technologists, 1992, Angus Wilde Publications, 2nd edition, Chapter 16, pp. 228-263.
Smook, Handbook for Pulp Paper Technologist, 1992, Angus Wilde Publications, 2nd Edition, Chapter 13, pp. 194-208.
Smook, Handbook of Pulp & Paper Terminology, 1990, pp. 89-90.
Song et al., Novel antiviral activity of dialdehyde starch, Electronic J. Biotech., vol. 12, No. 2, 2009.
Suchy et al., "Catalysis and Activation of Oxygen and Peroxide Delignification of Chemical Pulps; A Review," Miscellaneous Report, Pulp and Paper Research Institute of Canada, 1999, pp. 1-32.
Sun et al., "The effect of metal ions on the reaction of hydrogen peroxide with Kraft lignin model compounds" 1999, Can. J. Chem, vol. 77 (pp. 667-675).
Wojciak et al., "Direct Characterization of Hydrogen Peroxide Bleached Thermomechanial Pulp Using Spectroscopic Methods," J. Phys. Chem. A., vol. 111, pp. 10530-10536, 2007.
Zeronian et al., "Bleaching of cellulose by hydrogen peroxide," Cellulose, 1995, pp. 265-272.

\* cited by examiner

MODIFIED CELLULOSE FROM CHEMICAL FIBER AND METHODS OF MAKING AND USING THE SAME

This application claims the benefit of U.S. Provisional Applications No. 62/422,612, filed Nov. 16, 2016, which is incorporated herein by reference.

This disclosure relates to the chemical modification of cellulose. More particularly, this disclosure relates to chemically modified cellulose derived from bleached pulp that exhibits a unique set of characteristics, improving its performance over standard cellulose derived from pulp and making it useful in applications that have heretofore been limited to expensive celluloses (e.g., cotton or high alpha content sulfite pulp). Specifically, the chemically modified bleached cellulose may exhibit one or more of the following beneficial characteristics, including but not limited to, improved odor control, improved compressibility, improved absorption, improved softness, improved hand feel and/or improved brightness and/or whiteness. The chemically modified bleached cellulose may exhibit one or more of these beneficial characteristics while also maintaining one or more other characteristics of the non-chemically modified bleached cellulose, for example, maintaining fiber length, strength, freeness, and/or hemicellulose content. In some embodiments, the chemically modified cellulose may exhibit at least one of increased carboxyl content, increased carbonyl content, and/or decreased viscosity.

This disclosure also relates to methods for producing the improved chemically modified cellulose described. The cellulose is generally chemically modified by at least one catalytic oxidation treatment. In some embodiments, the cellulose is additionally chemically modified by at least one carboxylating acid treatment. It has been found that existing equipment in three-stage and four-stage bleaching plants may advantageously be converted as disclosed herein to make the oxidized cellulose of the present invention. Some embodiments therefore relate to multi-stage bleaching processes, including, for example, processes with three and four bleaching stages, wherein the cellulose is subjected to at least one catalytic oxidation treatment during at least one bleaching stage and, in some embodiments, at least one carboxylating acid treatment during at least one bleaching stage.

Finally, this disclosure relates to products produced using the improved oxidized cellulose as described. In general, the oxidized cellulose may be used as a partial or complete replacement in products where nonoxidized cellulose has traditionally been used. In some embodiments the oxidized cellulose can be used in a variety of products and devices, for example, in wipe, tissue, towel, napkin products and the like. In some embodiments the oxidized cellulose may be used, for example, as fluff pulp or in absorbent devices, diapers, adult incontinence products, wound dressings, sanitary napkins, and/or tampons, and the like. In some embodiments, the oxidized cellulose may be used, for example, in the manufacture of microcrystalline cellulose, which is widely used in food, pharmaceutical, cosmetic, and industrial applications, and is a purified crystalline form of partially depolymerized cellulose. In some embodiments, the oxidized cellulose may be used in other consumer product applications, and in some instances as a chemical cellulose feedstock in the production of cellulose derivatives including cellulose ethers, esters, viscose, and the like. In some embodiments, the oxidized cellulose may be used in packaging materials, for example, boxboards, cartons, corrugated boxes, fiberboards, papers, paperboards, films, coated and uncoated SBS, liquid package board, cup-stock, and the like.

The disclosed embodiments also disclose the use of oxidized cellulose in products as an anti-counterfeiting agent, and methods of testing for the same. In some embodiments, oxidized cellulose as described herein may be incorporated into a product, and the product may later be tested to determine whether the product still contains the oxidized cellulose, and is thus authentic and has not been replaced with a counterfeit material.

Additional objects and advantages of the present disclosure will be set forth in part in the description which follows. The objects and advantages of the present disclosure will further be realized and attained by means of the elements and combinations particularly pointed out in the appended claims.

The foregoing general description and the following detailed description are exemplary and explanatory only and are not restrictive of the claims.

DESCRIPTION

The oxidized cellulose according to the disclosed embodiments may be derived from any common source of cellulose, including wood or cotton. As used herein, the term "cellulose" includes materials derived from any source of cellulose, which may also comprise other materials such as, for example, hemicellulose, lignin, and/or other common source materials, so long as the primary component is cellulose. In some embodiments, the cellulose may be derived from softwood fiber, hardwood fiber, or mixtures thereof. In some embodiments, the cellulose may be derived from softwood, such as southern pine. In some embodiments, the cellulose may be derived from hardwood, such as *eucalyptus*. In some embodiments, the cellulose may be derived from a sawdust.

The cellulose may be in the form of a cellulose pulp derived from any common pulping process, including chemical, mechanical, or semi-mechanical. In some embodiments, the cellulose may be in the form of a pulp derived from a chemical process, for example, a Kraft, sulfite, or sulfate pulps. In some embodiments, the cellulose may be a Kraft pulp.

Commonly, cellulose pulp production includes an oxygen delignification process between pulping and the start of bleaching. This oxygen delignification process generally further reduces the lignin content and improves the effectiveness of any subsequent bleaching sequence. In some embodiments, the cellulose is further subject to oxygen delignifyication after pulping. Oxygen delignification can be performed by any method known to those of ordinary skill in the art. For instance, oxygen delignification may be a conventional two-stage oxygen delignification. In some embodiments, the cellulose is not further subjected to oxygen delignifyication after pulping.

The typical Kappa number (a measure used to estimate the amount of residual lignin in pulp) of softwood after Kraft pulping and prior to bleaching is in the range of 28 to 32. Kappa number is determined according to TAPPI T236 cm-85. In some embodiments, the cellulose may be subjected to a more severe "low kappa" pulping process, after which the Kappa number of the cellulose pulp is instead ranging from about 10 to about 21. In some embodiments, the cellulose may be subject to Kraft pulping in a two-vessel hydraulic digester with, Lo-Solids cooking to a Kappa number ranging from about 10 to about 21. In some embodiments, the cellulose pulp may then be subjected to oxygen delignification until it reaches a Kappa number of about 10 or below, for example, 8 or below, or 6.5 or below.

Following pulping and/or oxygen delignification, cellulose pulps are commonly bleached, often in multi-stage sequences that traditionally comprise strongly acidic and strongly alkaline bleaching steps. Bleaching of wood pulp is generally conducted with the aim of selectively increasing the whiteness and/or brightness of the pulp, typically by removing lignin and other impurities, without negatively affecting other physical properties. Bleaching of chemical pulps, such as Kraft pulps, generally requires several different bleaching stages to achieve a desired whiteness and/or brightness with good selectivity. Typically, a bleaching sequence employs stages conducted at alternating pH ranges. This alternation is believed to aid in the removal of impurities generated in the bleaching sequence, for example, by solubilizing the products of lignin breakdown.

In some embodiments, the cellulose may be subjected to any known bleaching processes after pulping and/or oxygen delignification, including any conventional or after-discovered series of stages conducted under conventional conditions. In some embodiments, the multi-stage bleaching sequence is a four-stage bleaching sequence. In other embodiments, the multi-stage bleaching sequence is a three-stage bleaching sequence.

In some embodiments, the bleaching process is conducted under conditions to target a final ISO brightness of at least about 85%, such as at least about 88%, or at least about 90%, for example, ranging from about 85 to about 95%, or from about 88% to about 91%. Brightness is determined according to TAPPI T525-om02. In some embodiments, the final ISO brightness may be achieved without the use of optical brightening agents. In some embodiments, an optical brightening agent can be added to further increase the ISO brightness of the bleached pulp in an amount of at least about 95%.

In some embodiments, the cellulose is derived from a process comprising Kraft pulping, followed by oxygen delignification, followed by bleaching. In some embodiments, the cellulose is derived from a process comprising Kraft pulping, without any bleaching. Unbleached Kraft pulp may also be referred to as "brown" Kraft pulp.

According to the present invention, the cellulose (including any hemicellulose portion) is oxidized. As used herein, the term "oxidized cellulose" means a cellulose (including any hemicellulose portion) that has been chemically treated to increase the amount of carbonyl and/or carboxyl groups over the amount present in the cellulose prior to oxidation. Cellulose exists generally as a polymer chain comprising hundreds to tens of thousands of glucose units whereas hemicelluloses are polysaccharides generally consisting of predominately of xylose in cellulose fibers derived from hardwoods and a combination of xylose, galactose, and mannose in cellulose fibers derived from softwoods. In cellulose and hemicellulose oxidation, hydroxyl groups of the wood sugars of the cellulose and hemicellulose chains can be converted, for example, to carbonyl groups such as aldehyde groups, ketone groups, and/or to carboxylic acid groups.

Various methods of oxidizing cellulose are known. Depending on the oxidation method and conditions used, the type, degree, and location of the modifications may vary. According to the present invention, the method of oxidation may be any known method of cellulose oxidation that increases the amount of carbonyl and/or carboxyl groups over the amount present in the cellulose prior to oxidation. In some embodiments, the oxidation increases both the carbonyl content and the carboxyl content of the cellulose pulp over the amount present in the cellulose prior to oxidation. In some embodiments, the oxidation increases the carbonyl and/or carboxyl content of the cellulose pulp primarily at the $C_2$ and $C_3$ carbons of the cellulose monomers. In some embodiments, the oxidation increases the carbonyl and/or carboxyl content of the cellulose pulp primarily at the $C_6$ carbons of the cellulose monomers.

The oxidation of the cellulose may occur at any point during production of the cellulose, including before or after pulping, before or after oxygen delignification, before or after bleaching, or during one or more stages of the bleaching process. In some embodiments, the oxidized cellulose may be an oxidized cellulose that is never subjected to a bleaching process prior to incorporation into a product. In some embodiments, the oxidized cellulose may be both bleached and oxidized prior to incorporation into a product.

In some embodiments, the method comprises oxidizing the cellulose in one or more stages of a multi-stage bleaching sequence. In some embodiments, the cellulose may be oxidized in either the second stage, third stage, or the fourth stage of a multi-stage bleaching sequence, for example, a four-stage or three-stage bleaching sequence. In some embodiments, the oxidation may be carried out in two or more stages of a multi-stage bleaching sequence, for example, both the second and fourth stages of a four-stage bleaching sequence. The non-oxidation stages of the multi-stage bleaching sequence may include any conventional or after discovered series of stages and may be conducted under conventional conditions.

In some embodiments, the oxidation of the cellulose may comprise treating the cellulose with at least one peroxide and at least one catalyst. In some embodiments, the oxidation of the cellulose may comprise treating the cellulose with at least a catalytic amount of a metal catalyst, for example, an iron or copper catalyst, and a peroxide, such as hydrogen peroxide. In some embodiments, the method comprises oxidizing the cellulose with iron and hydrogen peroxide. The source of iron can be any suitable source, as a person of skill would recognize, for example, ferrous sulfate (for example ferrous sulfate heptahydrate), ferrous chloride, ferrous ammonium sulfate, ferric chloride, ferric ammonium sulfate, ferric ammonium citrate, or elemental iron. In some embodiments, the method comprises oxidizing the cellulose with copper and hydrogen peroxide. Similarly, the source of copper can be any suitable source as a person of skill would recognize. In some embodiments, the method comprises oxidizing the cellulose with a combination of copper and iron and hydrogen peroxide.

In some embodiments, the method comprises oxidizing the cellulose at an acidic pH. In some embodiments, the method comprises providing the cellulose, acidifying the cellulose, and then oxidizing the cellulose at an acidic pH. In some embodiments, the pH of the oxidation ranges from about 2 to about 6, for example, from about 2 to about 5, or from about 2 to about 4. In some embodiments, the cellulose is not subjected to substantially alkaline conditions during or after oxidation. Without wishing to be bound by theory, it is believed that subjecting cellulose to alkaline conditions during or after oxidation results in the breaking of cellulose chains where dialdehyde or other similar groups may have been imparted by the oxidation (particularly at the $C_2$ and $C_3$ carbons). In some embodiments, the cellulose is subjected to substantially alkaline conditions during or after oxidation in order to reduce the degree of polymerization of the cellulose.

In some embodiments, the method of oxidizing the cellulose may involve acidifying a Kraft pulp to a pH ranging from about 2 to about 5 (for example using sulfuric acid), mixing a source of iron (for example ferrous sulfate or ferrous sulfate heptahydrate) with the acidified Kraft pulp at an application of from about 25 to about 300 ppm $Fe^{+2}$ based on the dry weight of the Kraft pulp and hydrogen peroxide, which can be added as a solution at a concentration of from about 1% to about 50% by weight and in an amount ranging from about 0.1% to about 4% based on the dry weight of the Kraft pulp. In some embodiments, a ferrous sulfate solution is mixed with the Kraft pulp at a consistency ranging from about 1% to about 15%, for example, from about 7% to about 15%. In some embodiments the acidic Kraft pulp is mixed with the iron source and reacted with the hydrogen peroxide for a time period ranging from about 40 to about 240 minutes, for example, from about 60 to 120 minutes. In some embodiments the acidic Kraft pulp is mixed with the iron source and reacted with the hydrogen peroxide at a temperature ranging from about 60 to about 90° C., for example, from about 60 to about 80° C.

In some embodiments, wherein the oxidation is carried out with a catalytic amount of a metal catalyst, for example, an iron or copper catalyst, and a peroxide, such as hydrogen peroxide, there is an acidic step, such as an acidic bleaching step, following oxidation, which step has been found to remove much, if not all, of the residual metal catalyst. In some embodiments, the acidic step is an acidic bleaching step comprising treatment with chlorine dioxide. In some embodiments, where an acidic step follows the catalytic oxidation step, the resultant oxidized cellulose has an iron and copper content of less than 10 ppm each, for example, less than 5 ppm each, wherein iron and copper content is determined by acid digestion and analysis by ICP.

In some embodiments, the oxidized cellulose may be further treated to modify the oxidized cellulose functional characteristics prior to incorporation in a product. In some embodiments, the oxidized cellulose may be treated with a carboxylating agent that converts aldehyde functional groups to carboxyl functional groups. In some embodiments, the carboxylating agent may be a carboxylating acid, for example, chlorous acid, acidic potassium dichromate, and/or potassium permanganate. In some embodiments, the treatment of the oxidized cellulose with a carboxylating agent may involve treating the oxidized cellulose with a chlorous acid source, such as sodium chlorite and hydrogen peroxide or chlorine dioxide and hydrogen peroxide. In some embodiments, the method comprises treating the oxidized cellulose with a carboxylating agent comprising sodium chlorite and hydrogen peroxide. In some embodiments, the method comprises treating the oxidized cellulose with a carboxylating agent comprising chlorine dioxide and hydrogen peroxide.

In some embodiments, the carboxylating treatment may be carried out for a time and at a temperature that is sufficient to produce the desired completion of the reaction. For example, the carboxylating treatment may be carried out at a temperature of at least about 55° C., or at least about 80° C., and for a time ranging from about 15 to about 120 minutes, for example, from about 15 to about 60 minutes, or from about 120 to about 150 minutes. The desired time and temperature of the carboxylating treatment will be readily ascertainable by a person of skill in the art depending on the desired conversion of aldehyde to carboxyl groups.

In some embodiments, a carboxylating agent may be added to the oxidized cellulose in an amount sufficient to achieve the desired carboxyl functionality of the final cellulose product. For example, sodium chlorite or chlorine dioxide can be added to the oxidized cellulose as a source of chlorous acid, as a solution at a concentration from about 0.1% to about 5%, for example, from about 0.25% to about 1.5%, from about 1.5% to about 2.5%, or from about 2.5% to about 5% by weight based on the dry weight of the pulp; and hydrogen peroxide can be added at a concentration of at least about 0.1%, at least about 0.25%, at least about 0.5%, at least about 1.0%, at least about 1.5%, or at least about 2%, at least about 2.5%, or at least about 3%, for example, from about 0.1% to about 5%, or from about 0.25% to about 2%, from about 1% to about 2%, or from about 2.5% to 5% by weight based on the dry weight of the pulp.

In some embodiments, the cellulose may be treated with a carboxylating agent after oxidation. In some embodiments, the cellulose may be treated with a carboxylating agent prior to oxidation. In some embodiments, the cellulose may be treated with a carboxylating agent both prior to and after oxidation.

In some embodiments, the oxidized cellulose may be treated with a carboxylating agent in one or more stages of a multi-stage bleaching sequence, for example, a three-stage or four-stage bleaching sequence. In some embodiments, the method of preparing the oxidized cellulose comprises subjecting the cellulose to a Kraft pulping step and a multi-stage bleaching sequence which includes at least one catalytic oxidation stage and at least one carboxylating treatment stage following the at least one catalytic oxidation stage. In some embodiments, the cellulose may be treated with a carboxylating agent in at least one of the first, third, and/or fourth stage of a multi-stage bleaching sequence, for example, a four-stage bleaching sequence. In some embodiments, the cellulose may be treated with a carboxylating agent in at least one of the first and/or third stage of a multi-stage bleaching sequence, for example, a three-stage bleaching sequence.

As used herein, the term "oxidized cellulose" may comprise situations wherein the cellulose has been oxidized but not further treated with a carboxylating agent or where the cellulose has been both oxidized and treated with a carboxylating agent.

Accordingly, as described herein, the cellulose may be subject to one or more of the following bleaching sequences, wherein "D" refers to a bleaching stage comprising chlorine dioxide (and optionally including hydrogen peroxide in the case of a carboxylating treatment stage), wherein subscripts "0" and "1" indicate that the conditions within each stage may optionally be the same or vary from one another; "E" refers to an alkaline extraction stage including E, $E_O$, $E_P$, or $E_{OP}$ bleaching stage (wherein "$E_O$" represents an alkaline extraction stage comprising treatment with oxygen, "$E_P$" represents an alkaline extraction stage comprising treatment with a peroxide, and "$E_{OP}$" represents an alkaline extraction stage comprising treatment with oxygen and a peroxide); and "OX" refers to an oxidation stage: $D_0E(OX)D_1$, $D_0(OX)ED_1$, $D_0(OX)D_1E$, $D_0ED_1(OX)$, $D_0(OX)D_1(OX)$, $D_0(OX)D_1D_2$, $D_0(OX)D_1$, $DE(OX)$, or $D(OX)E$. As discussed, in any of the preceding or following examples, one or more of the "D" stages may be a carboxylating treatment stage, comprising, for example, treatment with sodium chlorite and hydrogen peroxide or chlorine dioxide and hydrogen peroxide.

In some embodiments, the D stage(s) of the bleaching sequence may be carried out at a temperature of at least about 74° C., for example, at least about 77° C., for example, at least about 79° C., for example, or at least about 82° C. and at a pH of less than about 4, for example, less than 3.5, for example, less than 3.2. Chlorine dioxide may be applied in an amount of from about 0.1 to 5% based on the dry weight of the pulp, for example, from about 0.1 to about 1%, from about 0.5% to about 1.5%, from about 1.5% to about 2.5%, or from about 2.5% to about 5%. Caustic may be applied to the cellulose in an amount effective to adjust to the desired pH, for example, in an amount of less than about 0.015% on pulp, for example, less than about 0.01% pulp, for example, about 0.0075% on pulp. In some embodiments, where there is more than one D stage, the amount of chlorine dioxide utilized in the first $D_0$ stage may be greater than the amount of chlorine dioxide utilized in the second $D_1$ stage. In some embodiments, the amount of chlorine dioxide utilized in the first $D_0$ stage may be less than the amount of chlorine dioxide utilized in the second $D_1$ stage.

In some embodiments, wherein one or more of the D stages is a carboxylating treatment stage, the carboxylating treatment may be carried out at a temperature of at least about 55° C., at least about 60° C., at least about 66° C., or at least about 71° C., for example, from about 55° C. to about 80° C., or at a temperature of at least about 80° C., for a time period ranging from about 15 to about 120 minutes, for example, from about 15 to about 60 minutes, or from about 120 to 150 minutes, and at a pH of less than 3, for example, about 2.5. Sodium chlorite or chlorine dioxide at a concentration from about 0.1 to about 3% by weight based on the dry weight of the pulp can be used to generate chlorous acid, for example, from about 0.1 to about 2%, from about 0.1 to about 1%, from about 1 to about 2%, or from about 2 to about 3%. Hydrogen peroxide may be added in an amount from about 0.1 to about 2% by weight based on the dry weight of the pulp, for example, from about 0.1 to about 0.6%, from about 0.4 to about 1%, from about 1.2 to about 1.8% or from about 1.5 to about 2%. In some embodiments, where there is more than one carboxylating treatment stage, the amount of carboxylating acid and hydrogen peroxide utilized in the first carboxylating treatment stage may be greater than the amount of carboxylating acid and hydrogen peroxide utilized in the second carboxylating treatment stage. In some embodiments, the amount of carboxylating acid and hydrogen peroxide utilized in the first carboxylating treatment stage may be less than the amount of carboxylating acid and hydrogen peroxide utilized in the second carboxylating treatment stage.

In some embodiments, the E stage may be carried out at a temperature of at least about 74° C., for example, at least about 77° C., for example, at least about 79° C., for example, at least about 82° C., and at a pH of greater than about 11, for example, greater than 11.2, for example, about 11.4. Caustic may be applied in an amount of greater than about 0.7% on pulp, for example, greater than about 0.8% on pulp, for example, greater than about 1.0% on pulp, for example, about 1.5% on pulp. Oxygen may be applied to the cellulose in an amount of at least about 0.48% on pulp, for example, at least about 0.5% on pulp, for example, at least about 0.53% on pulp. Hydrogen Peroxide may be applied to the cellulose in an amount of at least about 0.35% on pulp, for example, at least about 0.37% on pulp, for example, at least about 0.38% on pulp, for example, at least about 0.4% on pulp, for example, at least about 0.45% on pulp. The skilled artisan would recognize that any known peroxygen compound could be used to replace some or all of the hydrogen peroxide.

In some embodiments, the oxidation stage(s) (OX) may be carried out at a temperature of at least about 75° C., for example, at least about 80° C., for example, at least about 82° C. and at a pH of less than about 3.5, for example, less than 3.0, for example, less than about 2.8. An iron catalyst may be added in, for example, aqueous solution at a rate of from about 25 to about 300 ppm $Fe^{+2}$, for example, from 25 to 100 ppm, 50 to 150 ppm, or from 150 to 300 ppm. Hydrogen peroxide may be added in an amount from about 0.1 to about 4% by weight based on the dry weight of the pulp, for example, from about 0.1 to about 1%, from about 1 to about 1.5%, from about 1.5 to about 2.5% or from about 2.5 to about 4%. The skilled artisan would also recognize that any known peroxygen compound could be used to replace some or all of the hydrogen peroxide. In some embodiments, where there is more than one oxidation stage, the amount of catalyst and hydrogen peroxide utilized in the first oxidation stage may be greater than the amount of catalyst and hydrogen peroxide utilized in the second oxidation stage. In some embodiments, the amount of catalyst and hydrogen peroxide utilized in the first oxidation stage may be less than the amount of catalyst and hydrogen peroxide utilized in the second oxidation stage.

In some embodiments, the oxidized cellulose may have a reduced viscosity compared to the cellulose prior to oxidation. In some embodiments, the viscosity may range from about 3.0 mPa·s to about 11.0 mPa·s, measured according to TAPPI T230-om99. In some embodiments, the viscosity ranges from about 3.0 mPa·s to about 8.0 mPa·s. In some embodiments, the viscosity ranges from about 4.0 mPa·s to about 7.5 mPa·s. In some embodiments, the viscosity ranges from about 4.5 mPa·s to about 6.0 mPa·s. In some embodiments, the viscosity of the oxidized cellulose is less than 11.0 mPa·s, less than 8.0 mPa·s, less than 7.0 mPa·s, less than 6.0 mPa·s, less than 5.0 mPa·s, or less than 4.0 mPa·s.

In some embodiments, when the oxidized cellulose is a softwood Kraft fiber, the cellulose fiber may have a length-weighted average fiber length that is about 2 mm or greater. Fiber length may be determined on a Fiber Quality Analyzer™ from OPTEST, Hawkesbury, Ontario, according to the manufacturer's standard procedures In some embodiments, the average fiber length is no more than about 3.7 mm. In some embodiments, the average fiber length is at least about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, or about 3.7 mm. In some embodiments, the average fiber length ranges from about 2 mm to about 3.7 mm, or from about 2.2 mm to about 3.7 mm.

In some embodiments, when the oxidized cellulose is a hardwood Kraft fiber, the cellulose fiber may have a length-weighted average fiber length that is about 0.6 mm or greater, for example, 1.0 mm or greater, or 1.4 mm or greater.

In some embodiments, the oxidized cellulose may have a carboxyl content of at least about 3 meq/100 g, for example, at least about 4 meq/100 g, or at least about 5 meq/100 g, measured according to TAPPI T237-cm98. In some embodiments, the carboxyl content ranges from about 3 meq/100 g to about 10 meq/100 g, for example, from about 6 meq/100 g to about 10 meq/100 g, or from about 3 meq/100 g to about 6 meq/100 g.

In some embodiments, the oxidized cellulose may have an aldehyde content of at least about 3 meq/100 g, for example, at least about 5 meq/100 g, at least about 6 meq/100 g, at least about 7.0 meq/100 g, at least about 8.0 meq/100 g, or at least about 10.0 meq/100 g. In some embodiments, the carboxyl content ranges from about 3 meq/100 g to about 15 meq/100 g, for example, from about 3 meq/100 g to about 7 meq/100 g. Aldehyde content is measured according to Econotech Services LTD, procedure ESM 055B.

The ratio of carboxyl content to aldehyde content in the oxidized cellulose may be from about 5:1 to 1:5, for example, from about 1:1 to about 5:1, or from about 5:1 to 1:1. The ratio of carboxyl content to aldehyde content in the oxidized cellulose may be from about 3:1 to 1:3, for example, from about 1:1 to about 3:1, or from about 3:1 to 1:1. The ratio of carboxyl content to aldehyde content in the oxidized cellulose may be from about 2:1 to 1:2, for example, from about 1:1 to about 2:1, or from about 2:1 to 1:1.

In some embodiments, the oxidized cellulose has a copper number of greater than about 1, for example, greater than about 1.5, greater than about 2, greater than about 3, greater than about 5, or greater than about 7. In some embodiments, the oxidized cellulose has a copper number of from about 1 to 7, for example, from about 3 to 6. Copper Number is measured according to TAPPI T430-cm99 and is believed to relate to the quantity of carbonyl groups on the cellulose.

In some embodiments, the oxidized cellulose of the disclosure has a carbonyl content of at least about 3 meq/100 g, for example, at least about 5 meq/100 g, at least about 6 meq/100 g, at least about 7.0 meq/100 g, at least about 8.0 meq/100 g, or at least about 10.0 meq/100 g. In some embodiments, the carbonyl content ranges from about 3 meq/100 g to about 15 meq/100 g, for example, from about 6 meq/100 g to about 12 meq/100 g. Carbonyl content is calculated from Copper Number according to the formula: carbonyl=(Cu. No. —0.07)/0.6, from *Biomacromolecules* 2002, 3, 969-975.

In some embodiments, the hemicellulose content following oxidation is substantially the same as the cellulose prior to oxidation. The hemicellulose content for a softwood Kraft fiber following oxidation may range from about 14% to about 18%, for example from about 14% to about 15%. The hemicellulose content of a hardwood Kraft fiber following oxidation may range from about 18% to about 30%. Carbohydrates are measured according to TAPPI T249-cm00, with analysis by Dionex ion chromatography. Cellulose content is calculated from carbohydrate composition according to the formula: Cellulose=Glucan-(Mannan/3), from TAPPI Journal 65(12):78-80 1982. Hemicellulose content is calculated from the sum of sugars minus the cellulose content.

R18 may also be used as an approximation for hemicellulose content in softwood fibers. In some embodiments, the oxidized cellulose may have an R18 value ranging from about 75% to about 90%, for example, from about 80% to about 90%, from about 80% to about 88%, or from about 82% to 86%. The R18 content is measured according to TAPPI T235-cm00.

In some embodiments, the fiber of the oxidized cellulose can be treated with a surfactant. The surfactant for use in the present invention may be solid or liquid. The surfactant can be any surfactant, including by not limited to softeners, debonders, and surfactants that is not substantive to the fiber, i.e., which does not interfere with its specific absorption rate. As used herein a surfactant that is "not substantive" to the fiber exhibits an increase in specific absorption rate of 30% or less as measured using the PFI test as described herein. According to some embodiments, the specific absorption rate is increased by 25% or less, such as 20% or less, such as 15% or less, such as 10% or less. Not wishing to be bound by theory, the addition of surfactant causes competition for the same sites on the cellulose as the test fluid. Thus, when a surfactant is too substantive, it reacts at too many sites reducing the absorption capability of the fiber.

As used herein PFI absorption is measured according to SCAN-C-33:80 Test Standard, Scandinavian Pulp, Paper and Board Testing Committee. The method is generally as follows. First, the sample is prepared using a PFI Pad Former. Turn on the vacuum and feed approximately 3.01 g cellulose pulp into the pad former inlet. Turn off the vacuum, remove the test piece and place it on a balance to check the pad mass. Adjust the mass to 3.00±0.01 g and record as $Mass_{dry}$. Place the cellulose into the test cylinder. Place the cellulose containing cylinder in the shallow perforated dish of an Absorption Tester and turn the water valve on. Gently apply a 500 g load to the cellulose pad while lifting the test piece cylinder and promptly press the start button. The Tester will run for 30 s before the display will read 00.00. When the display reads 20 seconds, record the dry pad height to the nearest 0.5 mm ($Height_{dry}$). When the display again reads 00.00, press the start button again to prompt the tray to automatically raise the water and then record the time display (absorption time, T). The Tester will continue to run for 30 seconds. The water tray will automatically lower and the time will run for another 30 seconds. When the display reads 20 s, record the wet pad height to the nearest 0.5 mm ($Height_{wet}$). Remove the sample holder, transfer the wet pad to the balance for measurement of $Mass_{wet}$ and shut off the water valve. Specific Absorption Rate (s/g) is $T/Mass_{dry}$. Specific Capacity (g/g) is $(Mass_{wet}-Mass_{dry})/Mass_{dry}$. Wet Bulk (cc/g) is $[19.64 \text{ cm}^2 \times Height_{wet}/3]/10$. Dry Bulk is $[19.64 \text{ cm}^2 \times Height_{dry}/3]/10$. The reference standard for comparison with the surfactant treated fiber is an identical fiber without the addition of surfactant.

It is generally recognized that softeners and debonders are often available commercially only as complex mixtures rather than as single compounds. While the following discussion will focus on the predominant species, it should be understood that commercially available mixtures would generally be used in practice. Suitable softener, debonder, and surfactants will be readily apparent to the skilled artisan and are widely reported in the literature.

Suitable surfactants include cationic surfactants, anionic, and nonionic surfactants that are not substantive to the fiber. According to some embodiments, the surfactant is a nonionic surfactant. According to some embodiments, the surfactant is a cationic surfactant. According to some embodiments, the surfactant is a vegetable based surfactant, such as a vegetable based fatty acid, such as a vegetable based fatty acid quaternary ammonium salt. Such compounds include DB999 and DB1009, both available from Cellulose Solutions. Other surfactants may be including, but not limited to Berol Visco® 388 a polyoxyl ethylene glycol derivative from Akzo Nobel. In some embodiments, the surfactant excludes nonylphenol products.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functional with quaternary ammonium chloride and diester dierucyldimethyl ammonium chloride and are representative biodegradable softeners.

The surfactant is added in an amount of up to 8 lbs/ton, such as from 2 lbs/ton to 7 lbs/ton, such as from 4 lbs/ton to 7 lbs/ton, such as from 6 lbs/ton to 7 lbs/ton.

The surfactant may be added at any point prior to forming rolls, bales, or sheets of pulp. According to some embodiments, the surfactant is added just prior to the headbox of the pulp machine, specifically at the inlet of the primary cleaner feed pump.

According to some embodiments, the fiber of the present invention has an improved filterability over the same fiber without the addition of surfactant when utilized in a viscose process. For example, the filterability of a viscose solution comprising fiber of the invention has a filterability that is at least 10% lower than a viscose solution made in the same way with the identical fiber without surfactant, such as at least 15% lower, such as at least 30% lower, such as at least 40% lower. Filterability of the viscose solution is measured by the following method. A solution is placed in a nitrogen pressurized (27 psi) vessel with a 1 and 3/16ths inch filtered orifice on the bottom. The filter media is as follows from outside to inside the vessel: a perforated metal disk, a 20 mesh stainless steel screen, muslin cloth, a Whatman 54 filter paper and a 2 layer knap flannel with the fuzzy side up toward the contents of the vessel. For 40 minutes the solution is allowed to filter through the media. Then at 40 minutes for an additional 140 minutes (t=0 at 40 minutes) the volume of filtered solution is measured (weight) with the elapsed time as the X coordinate and the weight of filtered viscose as the Y coordinate (the slope of this plot is your filtration number). Recordings to be made at 10 minute intervals. The reference standard for comparison with the surfactant treated fiber is the identical fiber without the addition of surfactant.

According to some embodiments of the invention, the surfactant treated fiber of the invention exhibits a limited increase in specific absorption rate, such as less than 30% with a concurrent decrease in filterability, such as at least 10%. According to some embodiments, the surfactant treated fiber has an increased specific absorption rate of less than 30% and a decreased filterability of at least 20%, such as at least 30%, such as at least 40%. According to another embodiment, the surfactant treated fiber has an increased specific absorption rate of less than 25% and a decreased filterability of at least 10%, such as at least about 20%, such as at least 30%, such as at least 40%. According to yet another embodiment, the surfactant treated fiber has an increased specific absorption rate of less than 20% and a decreased filterability of at least 10%, such as at least about 20%, such as at least 30%, such as at least 40%. According to another embodiment, the surfactant treated fiber has an increased specific absorption rate of less than 15% and a decreased filterability of at least 10%, such as at least about 20%, such as at least 30%, such as at least 40%. According to still another embodiment, the surfactant treated fiber has an increased specific absorption rate of less than 10% and an decreased filterability of at least 10%, such as at least about 20%, such as at least 30%, such as at least 40%.

Heretofore the addition of cationic surfactant to pulp bound for the production of viscose was considered detrimental to viscose production. Cationic surfactants attach to the same sites on the cellulose that caustic must react with to begin the breakdown of the cellulose fiber. Thus, it has long been thought that cationic materials should not be used as pulp pre-treatments for fibers used in the production of viscose. Not wishing to be bound by theory it is believed that since the fibers produced according to the present invention differs from prior art fiber in their form, character and chemistry, the cationic surfactant is not binding in the same manner as it did to prior art fibers. Fiber according to the disclosure, when treated with a surfactant according to the invention separates the fiber in a way that improves caustic penetration and filterability. Thus, according to some embodiments fibers of the present disclosure can be used as a substitute for expensive cotton or sulfite fiber to a greater extent than either untreated fiber or prior art fiber has been.

The addition of surfactant to the fiber of the present invention also improves the performance of fiber made into fluff pulp. Specifically, the surfactant can reduce the knots that can form between fibers and therefore produces a better airlaid or airformed product. The surfactant also improves the structure of the fluff product. Since the fibers have a lower affinity for one another, clumping is reduced. Further, the reduction in knots also results in lower energy consumption during fiberization and fluffing of the pulp.

The use of a surfactant also affects the physical characteristics of the products produced from the treated fiber. The fiber including a surfactant, or debonder, will see a reduction in web bursting strength and an improvement in embossability. The downside of using a surfactant to treat fibers that will be used in absorbent products is that the surfactant can reduce the number of hydrogen binding sites and therefore, lower water absorption rate and overall capacity.

In some embodiments, the oxidized cellulose of the disclosure has improved odor control properties. In some embodiments, the oxidized cellulose is capable of absorbing odorants, such as nitrogen containing odorants, for example, ammonia. As used herein, the term "odorant" is understood to mean a chemical material that has a smell or odor, or that is capable of interacting with olfactory receptors, or to mean an organism, such as a bacteria, that is capable of generating compounds that generate a smell or odor, for example, a bacteria that produces urea. In some embodiments, the oxidized cellulose is capable of reducing the odor of bodily waste, such as urine or menses, or from organic materials, such as food and vegetation. In some embodiments, the oxidized cellulose inhibits bacterial odor production, for example, in some embodiments, the oxidized cellulose inhibits bacterial ammonia production.

In some embodiments, the oxidized cellulose reduces atmospheric ammonia concentration more than the same non-oxidized cellulose. For example, the oxidized cellulose may reduce atmospheric ammonia by absorbing at least part of an ammonia sample applied to the oxidized cellulose, or by inhibiting bacterial ammonia production. In at least some embodiments, the oxidized cellulose fiber absorbs ammonia and inhibits bacterial ammonia production.

In some embodiments, the oxidized cellulose reduces at least about 40% more atmospheric ammonia than the same non-oxidized cellulose, for example, at least about 50% more, or about 60% more, or about 70% more, or about 75% more, or about 80% more, or about 90% more ammonia than the same non-oxidized cellulose.

In some embodiments, the oxidized cellulose, after application of 0.12 g of a 50% solution of ammonium hydroxide to about nine grams of oxidized cellulose and a 45 minute incubation time, reduces atmospheric ammonia concentration in a volume of 1.6 L to less than 150 ppm, for example, less than about 125 ppm, for example, less than bout 100 ppm, for example, less than about 75 ppm, for example, less than about 50 ppm.

In some embodiments, the oxidized cellulose absorbs at least about 5 ppm ammonia per gram of fiber, for example, at least about 7 ppm. For instance, the oxidized cellulose may absorb from about 5 to about 10 ppm, or from about 6 to about 10 ppm, or from about 7 to about 10 ppm, or from about 8 to about 10 ppm ammonia per gram of fibers.

In some embodiments, the oxidized cellulose or product may comprise an additional anti-odor agent. Any common anti-odor agent may be used, and will be known to those of ordinary skill in the art. In some embodiments, the oxidized cellulose and/or product may be made without the use of any additional anti-odor agents.

In some embodiments, the oxidized cellulose may exhibit improved antimicrobial activity. As used herein, the term antimicrobial activity refers to either antibacterial and/or antiviral activity, and includes either microbial-cidic and/or microbial-static activity. Without wishing to be bound by theory, it is believed that the increased carbonyl and/or carboxyl content of the cellulose following oxidation may contribute to the improved antimicrobial activity. For example, it is believed that the increased carboxylic acid content may create an acidic microenvironment to the cellulose fiber surface and surrounding environment, which acidic environment is lower than the optimal pH range for many microbes. The acidic environment may also be responsible for stabilizing chemical reactions which bind the functional groups of the oxidized cellulose to reactive groups on the microbial surface membrane, thus enhancing the antimicrobial effect. It is further believed that the increased aldehyde content may react with the microbial surface membrane thiol groups, thus disrupting the cell membrane. Aldehyde functional groups on the oxidized cellulose may also bind with nitrogen-containing material on the microbial surface membrane to disrupt the microbial cell membrane.

In some embodiments, the oxidized cellulose exhibits improved antibacterial activity compared to the same non-oxidized cellulose. In some embodiments, the oxidized cellulose has a bacteriostatic activity after 4 hours of at least 2.5, for example, at least 3.0, for example, at least 3.5, as measured by the Absorption Method. In some embodiments, the oxidized cellulose has a bactericidal activity at 4 hours of at least 1.5, for example, at least 2.0, as measured by the Absorption Method. In some embodiments, the oxidized cellulose has antibacterial properties affecting common bacteria, including but not limited to, *Staphylococcus aureus, Escherichia coli, Salmonella enterica-pullorum, Listeria monocytogenes, Pseudomonas aeruginosa, Enterococcus faecalisi*, and the like.

In some embodiments, the oxidized cellulose has an MEM Elution Cytotoxicity Test, ISO 10993-5, of less than 2 on a zero to four scale. For example, the cytotoxicity may be less than about 1.5 or less than about 1.

In some embodiments, the oxidized cellulose or product may comprise an additional antibacterial agent additive. Any common antibacterial agent may be used, and will be known to those of ordinary skill in the art. In some embodiments, the oxidized cellulose and/or product may be made without the use of any additional antibacterial agents.

In some embodiments, the oxidized cellulose exhibits antiviral activity. In some embodiments, the oxidized cellulose or product may comprise an additional antiviral agent additive. Any common antiviral agent may be used, and will be known to those of ordinary skill in the art. In some embodiments, the oxidized cellulose and/or product may be made without the use of any additional antiviral agents.

The oxidized cellulose may further be treated with other agents prior to incorporation into a product, including, without limitation, one or more of surfactants, softeners, debonders, starches, wet strength agents, and the like. Specific agents are well known to those of skill in the art depending on the end-use for the cellulose.

The oxidized cellulose may be incorporated into any product known to incorporate non-oxidized cellulose. In some embodiments the oxidized cellulose can be used in, for example, tissue (such as facial or bath tissue), wipe, towel, napkin products and the like. In some embodiments, the oxidized cellulose may be incorporated into a wipe, tissue, towel, or napkin product that has been produced on a papermaking machine. In some embodiments, the oxidized cellulose may be incorporated into the headbox of a papermaking machine. In some embodiments, the oxidized cellulose may comprise either softwood, hardwood, or a mixture of both. In some embodiments, the oxidized cellulose may comprise *eucalyptus* hardwood. In some embodiments, the oxidized cellulose may comprise sawdust. In some embodiments, the wipe, tissue, towel, or napkin product may comprise other, non-oxidized cellulose that is combined with the oxidized cellulose.

In some embodiments, the wipe, tissue, towel, or napkin product may be a single-ply product. In some embodiments, the wipe, tissue, towel, or napkin product may be a multi-ply product. In some embodiments, the oxidized cellulose may be incorporated into a single ply of a multi-ply wipe, tissue, towel, or napkin product. In some embodiments, the oxidized cellulose may be incorporated into more than one ply of a multi-ply wipe, tissue, towel, or napkin product. In some embodiments, the wipe, tissue, towel, or napkin product may exhibit improved softness. In some embodiments, the wipe, tissue, towel, or napkin product may exhibit improved hand feel.

In some embodiments, the wipe, tissue, towel, or napkin product may be made using conventional wet-laid technology. Examples of wet-laid technologies that may be used include Through Air Drying (TAD), eTAD, Uncreped Through Air Drying (UCTAD), Conventional Wet Crepe (CWC), Conventional Dry Crepe (CDC), Advanced Tissue Molding System (ATMOS), Advantage New Tissue Technology (NTT), and the like. In some embodiments, the wipe, tissue, towel, or napkin product may be further creped and/or embossed. In some embodiments, the wipe, tissue, towel, or napkin product may comprise chemical additives, including softeners, debonders, strength-adjusting agents, sizing agents, surfactants, and the like.

In some embodiments the oxidized cellulose may be used, for example, as fluff pulp or in absorbent devices, diapers, adult incontinence products, wound dressings, sanitary napkins, and/or tampons, and the like. In some embodiments, the oxidized cellulose may be used, for example, in the manufacture of microcrystalline cellulose, which is widely used in food, pharmaceutical, cosmetic, and industrial applications, and is a purified crystalline form of partially depolymerized cellulose. In some embodiments, the oxidized cellulose may be used in other consumer product applications, and in some instances as a chemical cellulose feedstock in the production of cellulose derivatives including cellulose ethers, esters, viscose, and the like. In some embodiments, the oxidized cellulose may be used in packaging materials, for example, boxboards, cartons, corrugated boxes, fiberboards, papers, paperboards, films, coated and uncoated SBS, liquid package board, cup-stock, and the like.

In some embodiments, the oxidized cellulose may be used as a partial or complete replacement where non-oxidized cellulose is used in traditional products. In some embodiments, the oxidized cellulose may be used as a partial or complete replacement where other, non-cellulose materials are used in traditional products, such as a partial or complete replacement for a plastic, polymer, or the like.

In some embodiments, the oxidized cellulose may be included in the product in an amount of at least about 2% oxidized cellulose by weight based on the weight of the product, for example, at least about 5%, at least about 10%, at least about 20%, at least about 50%, at least about 75%, or 100%.

In some embodiments, the oxidized cellulose may be included in a product and used as an anti-counterfeiting agent. In some embodiments, an oxidized cellulose may be incorporated into a product and the product may later be tested by a method capable of identifying the presence of the oxidized cellulose in order to confirm that the product has not been replaced with a different product that does not comprise the oxidized cellulose.

The method for testing for the presence of the oxidized cellulose may be any testing method capable of distinguishing between a product comprising oxidized cellulose and a product that does not comprise the oxidized cellulose. In some embodiments, the method of testing is a method capable of identifying the presence of the oxidized cellulose by identifying the elevated levels of carbonyl and/or carboxyl groups in the oxidized cellulose, as compared to non-oxidized cellulose. In some embodiments, the method of testing for the presence of the oxidized cellulose may comprise treating the product, or a portion thereof, with a chemical reagent. As used herein, the term chemical reagent may refer to one or more chemical substances either alone, or in combination, such as in a solution, mixture, or the like.

In some embodiments, the chemical reagent is capable of identifying the presence of the oxidized cellulose by reacting with the elevated levels of carbonyl groups on the oxidized cellulose. In some embodiments, the chemical reagent is capable of identifying the presence of the oxidized cellulose by reacting with the elevated levels of carboxyl groups on the oxidized cellulose. In general, the higher the level of the oxidized cellulose in the material tested, the more pronounced identification of the oxidized cellulose in the material will be. In some embodiments, the test method can detect as little as 5% by weight incorporation of oxidized cellulose into a product, or less.

In some embodiments, the method of testing for the presence of the oxidized cellulose may comprise treating the product, or a portion thereof, with Tollen's reagent. Tollen's reagent comprises a solution of silver nitrate and ammonia, and, without wishing to be bound by theory, is believed to be able to identify the presence of the oxidized cellulose by reacting with the elevated levels of carbonyl groups on the oxidized cellulose (such as aldehydes and ketones), resulting in the precipitation of elemental silver and the production of a silver-mirror-like finish on the surface of the area tested. Thus, if the product comprises oxidized cellulose, upon treatment with Tollens' reagent, it will exhibit the presence of a pronounced silver-mirror-like finish on the surface of the area tested, as compared to treatment of the same product not comprising the oxidized cellulose. In some embodiments, the Tollen's reagent may be modified to additionally include NaOH.

In some embodiments, the method of testing for the presence of the oxidized cellulose may comprise treating the product, or a portion thereof, with 2,4 Dinitrophenylhydrazine (2,4 DNPH). In some embodiments, the method of testing for the presence of the oxidized cellulose may comprise treating the product, or a portion thereof, with Schiff's reagent.

If the test method is able to identify the presence of the oxidized cellulose in the product, one may be able to authenticate that the product tested has not been replaced with another product that does not contain the oxidized cellulose. To the contrary, if the test method does not identify the presence of the oxidized cellulose in the product, it may be concluded that the product tested is not the same as the original product that was made with the inclusion of the oxidized cellulose. In such circumstances, it may be hypothesized that the original product made with the inclusion of the oxidized cellulose has been replaced with a counterfeit version of the product that does not include the oxidized cellulose. In this way, producers of oxidized cellulose and/or products comprising oxidized cellulose may be able to track any products being sold under the representation that it is from the source including the oxidized cellulose to determine if the representation is accurate.

EXAMPLES

Test Protocols
1. Caustic solubility (R10, S10, R18, S18) is measured according to TAPPI T235-cm00.
2. Carboxyl content is measured according to TAPPI T237-cm98.
3. Aldehyde content is measured according to Econotech Services LTD, proprietary procedure ESM 055B.
4. Copper Number is measured according to TAPPI T430-cm99.
5. Carbonyl content is calculated from Copper Number according to the formula: carbonyl=(Cu. No. —0.07)/ 0.6, from *Biomacromolecules* 2002, 3, 969-975.
6. 0.5% Capillary CED Viscosity is measured according to TAPPI T230-om99.
7. Intrinsic Viscosity is measured according to ASTM D1795 (2007).
8. DP is calculated from 0.5% Capillary CED Viscosity according to the formula: DPw=−449.6+598.4 ln (0.5% Capillary CED)+118.02 ln$^2$ (0.5% Capillary CED), from the 1994 Cellucon Conference published in *The Chemistry and Processing Of Wood And Plant Fibrous Materials*, p. 155, woodhead Publishing Ltd, Abington Hall, Abington, Cambridge CBI 6AH, England, J. F. Kennedy, et al. editors.
9. Carbohydrates are measured according to TAPPI T249-cm00 with analysis by Dionex ion chromatography.
10. Cellulose content is calculated from carbohydrate composition according to the formula: Cellulose=Glucan-(Mannan/3), from *TAPPI Journal* 65(12):78-80 1982.
11. Hemicellulose content is calculated from the sum of sugars minus the cellulose content.
12. Fiber length and coarseness is determined on a Fiber Quality Analyzer™ from OPTEST, Hawkesbury, Ontario, according to the manufacturer's standard procedures.
13. Wet Zero Span Tensile is determined according to TAPPI T273-pm99.
14. Freeness is determined according to TAPPI T227-om99.
15. DCM (dichloromethane) extractives are determined according to TAPPI T204-cm97.
16. Iron content is determined by acid digestion and analysis by ICP.
17. Ash content is determined according to TAPPI T211-om02.
18. Brightness is determined according to TAPPI T525-om02.
19. Fiber Length and shape factor are determined on an L&W Fiber Tester from Lorentzen & Wettre, Kista, Sweden, according to the manufacturer's standard procedures.

Example 1

Four samples of a Kraft delignified southern hardwood pulp were collected off the second stage (E$_{OP}$) of a four-stage bleach plant. The samples were subjected to a third-stage oxidation (OX) with either 0.25, 0.5, 1.0, or 1.5% hydrogen peroxide ($H_2O_2$) and an iron catalyst in the amount of 100 ppm as $Fe^{+2}$. Each of the samples was then further bleached in a final, fourth stage ($D_1$). The full sequence was $D_0E_{OP}(OX)D_1$. The final viscosity and brightness values were measured according to TAPPI standards. The results are shown in Table 1.

TABLE 1

| Stages 1 & 2 | Initial Viscosity (mPa · s) | Initial Brightness | Stages 3 | 4 | Final Viscosity (mPa · s) | Final Brightness |
|---|---|---|---|---|---|---|
| $D_0E_{OP}$ | 22.3 | 75 | 0.25% $H_2O_2$, 100 ppm $Fe^{+2}$ | 0.9% $ClO_2$ | 10.9 | 88.8 |
| $D_0E_{OP}$ | 22.3 | 75 | 0.50% $H_2O_2$, 100 ppm $Fe^{+2}$ | 0.9% $ClO_2$ | 7.3 | 89.3 |
| $D_0E_{OP}$ | 22.3 | 75 | 1.00% $H_2O_2$, 100 ppm $Fe^{+2}$ | 0.9% $ClO_2$ | 6.3 | 90.0 |
| $D_0E_{OP}$ | 22.3 | 75 | 1.50% $H_2O_2$, 100 ppm $Fe^{+2}$ | 0.9% $ClO_2$ | 4.2 | 91.0 |

Example 2

Three samples of Kraft delignified southern hardwood were collected off the third stage ($D_1$) of a four-stage bleach plant. The samples were treated with 1, 1.5, or 2% $H_2O_2$ and an iron catalyst in the amount of 100 or 150 ppm of $Fe^{+2}$. The full sequence was $D_0E_{OP}D_1(OX)$. The viscosity and functional groups were measured according to the procedures referenced herein. The results are shown in Table 2.

TABLE 2

| Stage | Chemical | | Viscosity (mPa · s) | Carboxyl (meq/100 g) | Aldehyde (meq/100 g) | Copper No. |
|---|---|---|---|---|---|---|
| $D_1$ initial | | | 12.0 | 5.2 | 1.0 | 0.6 |
| OX | 1% $H_2O_2$ | 100 ppm $Fe^{+2}$ | 3.7 | 5.0 | 4.1 | 3.7 |
| OX | 1.5% $H_2O_2$ | 100 ppm $Fe^{+2}$ | 3.2 | 5.5 | 5.0 | 4.6 |
| OX | 2% $H_2O_2$ | 150 ppm $Fe^{+2}$ | 3.0 | 5.5 | 5.7 | 5.5 |

Example 3

Two samples of Kraft delignified northern softwood pulp were collected from the first stage ($D_0$) of a bleach plant. The first sample was further bleached with two additional stages, ($E_P$) and ($D_1$). The second sample was further bleached with three additional stages, ($E_P$), (OX), and $D_1$. The final viscosity and brightness values were measured according to TAPPI standards. The bleaching conditions and results are shown in Table 3.

TABLE 3

| Initial Viscosity (mPa · s) | Initial Brightness | Stage 2 | 3 | 4 | Final Viscosity (mPa · s) | Final Brightness |
|---|---|---|---|---|---|---|
| 23.3 | 42.3 | 1.6% NaOH 0.4% $H_2O_2$ | 0.8% $ClO_2$ | N/A | 21.3 | 88.1 |
| 23.3 | 42.3 | 1.6% NaOH 0.4% $H_2O_2$ | 1.0% $H_2O_2$, 100 ppm $Fe^{+2}$ | 0.9% $ClO_2$ | 4.4 | 90.0 |

Example 4

The functional group contents of the pulps in Example 3 were measured according to standard procedures and the results are shown in Table 4.

TABLE 4

| Sequence | Viscosity (mPa · s) | Carboxyl (meq/100 g) | Aldehyde (meq/100 g) | Copper No. |
|---|---|---|---|---|
| $D(E_P)D$ | 21.3 | 3.4 | 0.8 | 0.65 |
| $D(E_P)(OX)D$ | 4.4 | 4.8 | 3.3 | 3.05 |

Example 5

A sample of Kraft delignified northern softwood pulp was collected from the brown stock washer of a pulp mill. The sample was bleached in a four-stage sequence with ($D_0$), (OX), ($D_1$), (D2). The (OX) stage was done with either 0.5%, 1.0%, or 1.5% $H_2O_2$ added and 50 ppm, 100 ppm, or 150 ppm $Fe^{+2}$ respectively. The initial viscosity was 31.1 mPa·s and the initial brightness was 26.6. The final viscosity and brightness values were measured according to TAPPI standards as described above. The bleaching conditions and results are shown in Table 5.

TABLE 5

| Sample | Sequence | Stage 1 | 2 | 3 | 4 | Final Viscosity (mPa · s) | Final Brightness % |
|---|---|---|---|---|---|---|---|
| A | D(OX)DD | 2.9% ClO2 | 0.5% $H_2O_2$ 50 ppm $Fe^{+2}$ | 1.0% $ClO_2$ | 1.0% $ClO_2$ | 6.3 | 87.0 |
| B | D(OX)DD | 2.9% ClO2 | 1.0% $H_2O_2$ 100 ppm $Fe^{+2}$ | 1.0% $ClO_2$ | 1.0% $ClO_2$ | 4.9 | 87.7 |
| C | D(OX)DD | 2.9% ClO2 | 1.5% $H_2O_2$ 150 ppm $Fe^{+2}$ | 1.0% $ClO_2$ | 1.0% $ClO_2$ | 3.7 | 89.6 |

Example 6

The functional group contents of the pulps in Example 5 were measured according to the procedures described above and the results are shown in Table 6.

TABLE 6

| Sample | Sequence | Viscosity (mPa · s) | Carboxyl (meq/100 g) | Aldehyde (meq/100 g) | Copper No. |
|---|---|---|---|---|---|
| A | D(OX)DD | 6.3 | 5.2 | 1.8 | 1.8 |
| B | D(OX)DD | 4.9 | 5.3 | 2.3 | 2.5 |
| C | D(OX)DD | 3.7 | 6.7 | 2.9 | 3.6 |

Example 7

A sample of Kraft delignified northern softwood pulp was collected from the brown stock washer of a pulp mill. The sample was bleached in a three-stage sequence with $D_0(OX)D_1$. The final viscosity and brightness values were measured according to the procedures described above. The bleaching conditions and results are shown in Table 7.

TABLE 7

| Sample | Sequence | Stage 1 | Stage 2 | Stage 3 | Final Viscosity (mPa · s) | Final Brightness % |
|---|---|---|---|---|---|---|
| D | D(OX)D | 2.9% $ClO_2$ | 1.0% $H_2O_2$ 100 ppm $Fe^{+2}$ | 2.0% $ClO_2$ | 4.4 | 86.3 |

Example 8

The functional group contents of the pulps in Example 7 were measured according to standard procedures and the results are shown in Table 8.

TABLE 8

| Sample | Sequence | Viscosity (mPa · s) | Carboxyl (meq/100 g) | Aldehyde (meq/100 g) | Copper No. |
|---|---|---|---|---|---|
| D | D(OX)D | 4.4 | 5.7 | 2.8 | 2.7 |

What is claimed is:

1. A method of making an oxidized cellulose comprising: bleaching a cellulosic pulp using a bleaching process consisting of four bleaching stages, wherein at least one stage of the four-stage bleaching process is an oxidizing (OX) stage comprising oxidizing the pulp with at least one peroxide and at least one catalyst under acidic conditions; and wherein the four-stage bleaching process is a sequence chosen from one of $D_0E(OX)D_1$, $D_0ED_1(OX)$, $D_0(OX)D_1(OX)$, or $D_0(OX)D_1D_2$.

2. The method according to claim 1, wherein the at least one catalyst comprises at least one of a copper-containing catalyst and an iron-containing catalyst, and wherein the at least one peroxide is hydrogen peroxide.

3. The method according to claim 2, wherein at least one stage of the bleaching process is a carboxylating D stage comprising treating the fiber with a carboxylating agent.

4. The method according to claim 2, wherein the four-stage bleaching process is a sequence chosen from one of $D_0E(OX)D_1$ or $D_0(OX)D_1D_2$.

5. The method according to claim 2, wherein no the four-stage bleaching process is a sequence chosen from one of $D_0E(OX)D_1$, $D_0ED_1(OX)$, $D_0(OX)D_1(OX)$, or $D_0(OX)D_1D_2$.

6. The method according to claim 2, wherein the four-stage bleaching process is a sequence chosen from one of $D_0E(OX)D_1$, $D_0(OX)D_1(OX)$, or $D_0(OX)D_1D_2$ and wherein the at least one oxidizing stage is followed by at least one carboxylating D stage comprising treating the fiber with a carboxylatinq agent.

7. The method according to claim 2, wherein the at four-stage bleaching process is a sequence chosen from one of $D_0(OX)D_1(OX)$ or $D_0(OX)D_1D_2$.

8. The method according to claim 2, wherein the four-stage bleaching process is $D_0E(OX)D_1$.

9. The method according to claim 2, wherein the four-stage bleaching process is a sequence chosen from one of $D_0ED_1(OX)$ or $D_0(OX)D_1(OX)$.

10. A method of making an oxidized cellulose comprising:
bleaching a cellulosic pulp using a bleaching process consisting of three bleaching stages, wherein at least one stage of the three-stage bleaching process is an oxidizing (OX) stage comprising oxidizing the pulp with at least one peroxide and at least one catalyst under acidic conditions, and
wherein the three-stage bleaching process is a sequence chosen from one of $D_0(OX)D_1$, DE(OX), or D(OX)E.

11. The method according to claim 10, wherein the at least one catalyst comprises at least one of a copper-containing catalyst and an iron-containing catalyst, and wherein the at least one peroxide is hydrogen peroxide.

12. The method according to claim 11, wherein at least one stage of the bleaching process is a carboxylating D stage comprising treating the fiber with a carboxylating agent.

13. The method according to claim 11, wherein the three-stage bleaching process is a sequence chosen from one of $D_0(OX)D_1$ or D(OX)E.

14. The method according to claim 11, wherein the three-stage bleaching process is a sequence chosen from one of $D_0(OX)D_1$ or DE(OX).

15. The method according to claim 11, wherein the three-stage bleaching process is $D_0(OX)D_1$ and $D_1$ is a carboxylating D stage comprising treating the fiber with a carboxylating agent.

16. The method according to claim 11, wherein the three-stage bleaching process is a sequence chosen from one of $D_0(OX)D_1$ or D(OX)E.

17. The method according to claim 11, wherein the three-stage bleaching process is $D_0(OX)D_1$.

18. The method according to claim 1, wherein at least one of the D stages is a carboxylating D stage comprising treatment with either sodium chlorite and hydrogen peroxide or chlorine dioxide and hydrogen peroxide.

19. The method according to claim 18, wherein the four-stage bleaching process is a sequence chosen from one of $D_0E(OX)D_1$, $D_0(OX)D_1(OX)$, or $D_0(OX)D_1D_2$ and wherein the at least one D stage comprising treatment with either sodium chlorite and hydrogen peroxide or chlorine dioxide and hydrogen peroxide follows at least one oxidizing stage.

20. The method according to claim 10, wherein at least one of the D stages is a carboxylating D stage comprising treatment with either sodium chlorite and hydrogen peroxide or chlorine dioxide and hydrogen peroxide.

21. The method according to claim 10, wherein the three-stage bleaching process is $D_0(OX)D_1$, and wherein the $D_1$ stage is a carboxylating D stage comprising treatment with either sodium chlorite and hydrogen peroxide or chlorine dioxide and hydrogen peroxide.

\* \* \* \* \*